United States Patent [19]

Woods et al.

[11] Patent Number: 4,813,077

[45] Date of Patent: Mar. 14, 1989

[54] SALES TRANSACTION RECORD PROCESSING SYSTEM AND METHOD

[75] Inventors: Daniel E. Woods, Vernon; Ronald E. Gocht, Manchester; Peter M. Higgins, Enfield; Anne M. Edwards, West Hartford; Hugh Rowlands, Hartford; Edward F. Scanlon, Ellington; Jerry Putzer, Rocky Hill, all of Conn.

[73] Assignee: Scan-Optics, Inc., East Hartford, Conn.

[21] Appl. No.: 891,869

[22] Filed: Jul. 30, 1986

[51] Int. Cl.$^4$ ................................. G06K 9/00
[52] U.S. Cl. ........................... 382/7; 235/379; 382/61
[58] Field of Search .............. 382/7, 61, 62, 63, 48; 235/379, 380, 495, 483, 487

[56] References Cited

U.S. PATENT DOCUMENTS

| | | | |
|---|---|---|---|
| 3,501,623 | 3/1970 | Robinson | 382/61 |
| 4,021,777 | 5/1977 | Shepard | 382/61 |
| 4,201,978 | 5/1980 | Nally | 382/7 |
| 4,264,808 | 4/1981 | Owens et al. | 382/7 |
| 4,454,610 | 6/1984 | Sziklai | 235/380 |
| 4,493,108 | 1/1985 | Fryer et al. | 382/48 |
| 4,516,265 | 5/1985 | Kizu et al. | 382/63 |
| 4,523,330 | 6/1985 | Cain | 382/7 |
| 4,553,261 | 11/1985 | Froessl | 382/61 |

Primary Examiner—Leo H. Boudreau
Attorney, Agent, or Firm—Chilton, Alix & Van Kirk

[57] ABSTRACT

The processing of documents evidencing business transactions is enhanced by optically scanning and imaging only specific areas of interest, amount fields for example, and simultaneously storing the imaged amount fields in two separate files. Subsequently, only those images which correspond to a dollar amount which has not been successfully read will initially be displayed to an operator for key entry of the amount. A balancing procedure is performed and if a comparison of the total of the individual imaged amounts equals the total entered on a summary document further key entry of amounts will be unnecessary.

32 Claims, 16 Drawing Sheets

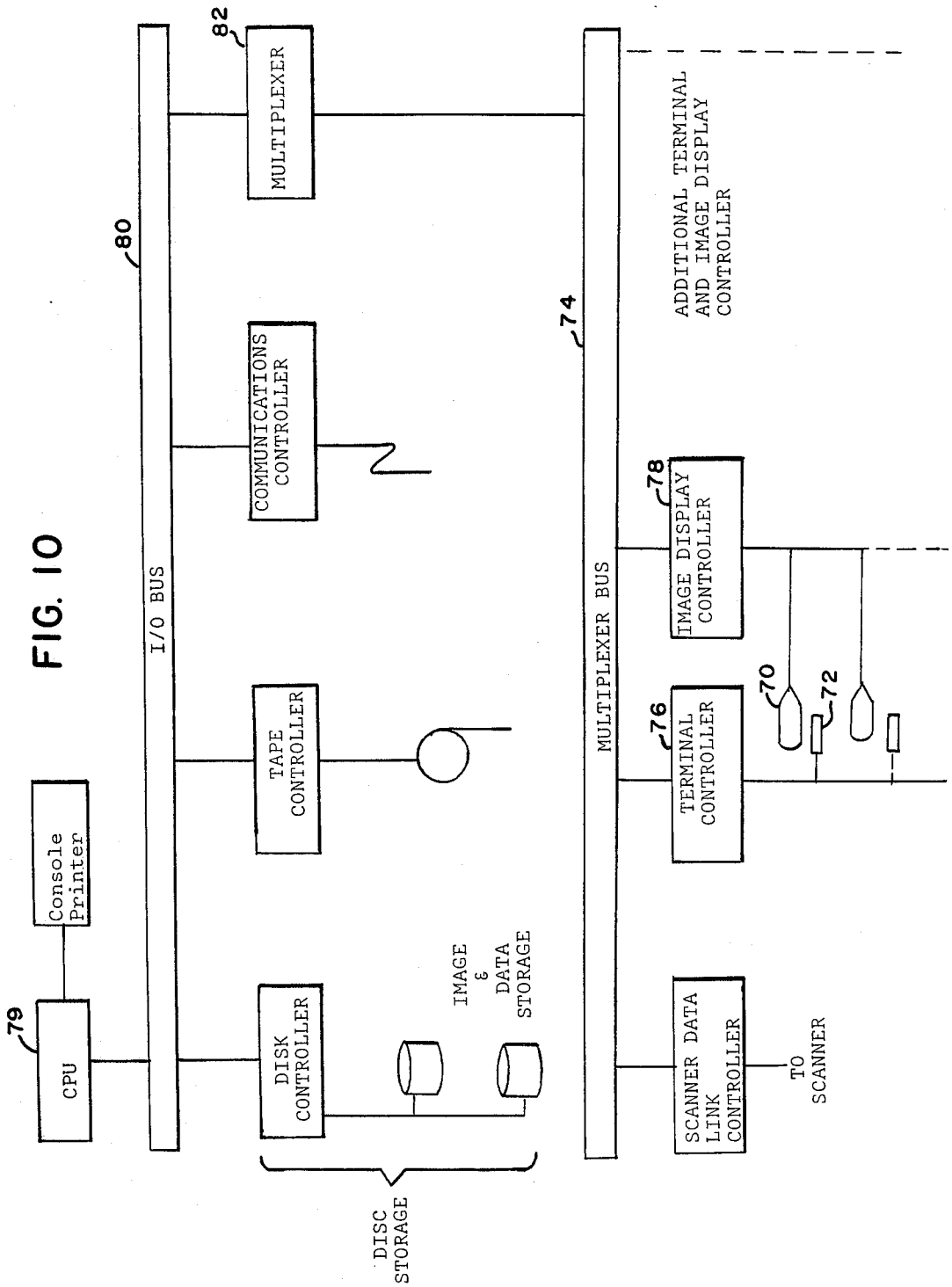

MERCHANT TRANSMITTAL (DEPOSIT) RECORD

| NAME | POSITION | LENGTH | COMMENTS |
|---|---|---|---|
| RECORD ID | 1 | 1 | CONSTANT "M" |
| IMAGE FLAG | 2-6 | 5 | NUMERIC SEQUENCE NUMBER |
| SEQUENCE NUMBER | 7-12 | 6 | SCANNER INKJET NUMBER |
| FILLER | 13 | 1 | BLANK |
| MERCHANT NUMBER | 14-29 | 16 | 7 OR 8 DIGITS (MOD 10 CK-D) |
| BALANCE FIELD | 30 | 1 | BLANK (USED IN FOREGROUND) |
| PLUG DATE FLAG | 31 | 1 | 0 = DO NOT PLUG DATE<br>1 = PLUG DATE |
| KEY AMOUNT FLAG | 32 | 1 | 0 = AMOUNT WAS SCANNED<br>1 = AMOUNT NOT SCANNED |
| LAST DIGIT | 33 | 1 | BLANK (KEYED IN FOREGROUND WHEN AMOUNT IS NOT SCANNED) |
| FILLER | 34-50 | 15 | BLANKS |
| SIGN | 51 | 1 | "+" OR "-" |
| AMOUNT | 52-61 | 10 | NUMERIC |
| FILLER | 62-64 | 3 | BLANKS |
| MERCHANT FLAG | 65 | 1 | 0 = MERCHANT NUMBER SCANNED<br>1 = MERCHANT NUMBER REJECTED |
| FILLER | 66 | 1 | CONSTANT ZERO |
| AMOUNT FLAG | 67 | 1 | 0 = AMOUNT SCANNED<br>1 = AMOUNT REJECTED |

FIG. 11

SALES DRAFT RECORD

| NAME | POSITION | LENGTH | COMMENTS |
|---|---|---|---|
| RECORD ID | 1 | 1 | CONSTANT "D" |
| IMAGE FLAG | 2-6 | 5 | NUMERIC SEQUENCE NUMBER |
| SEQUENCE NUMBER | 7-12 | 6 | SCANNER INKJET NUMBER |
| SORT CODE | 13 | 1 | "0" OR "1" |
| ACCOUNT NUMBER | 14-29 | 16 | 13 OR 16 DIGITS (MOD 10 CK-D) |
| ADJUSTMENT CODE | 30 | 1 | "A" or BLANK |
| REASON CODE | 31-32 | 2 | NUMERIC |
| LAST DIGIT | 33 | 1 | BLANK (KEYED IN FOREGROUND WHEN AMOUNT IS NOT SCANNED) |
| DATE | 34-37 | 4 | MMDD |
| AUTHORIZATION | 38 | 1 | "0" OR "1" |
| RUNNING TOTAL | 39-49 | 11 | BLANKS (PLUGGED IN FOREGROUND BALANCE ROUTINE) |
| INPUT TRAN CODE | 50 | 1 | "5", "6", OR "7" |
| SIGN | 51 | 1 | "+" OR "-" |
| AMOUNT | 52-61 | 10 | NUMERIC (Z,R) |
| OUTPUT TRAN CODE | 62 | 1 | "5", "6", OR "7" |
| FILLER | 63-64 | 2 | BLANKS |
| ACCOUNT STATUS | 65 | 1 | 0 = ACCOUNT NUMBER SCANNED<br>1 = ACCOUNT NUMBER REJECTED |
| DATE STATUS | 66 | 1 | 0 = DATE SCANNED<br>1 = DATE REJECTED |
| AMOUNT STATUS | 67 | 1 | 0 = AMOUNT SCANNED<br>1 = AMOUNT REJECTED |

FIG. 12

SALES TRANSACTION RECORD PROCESSING SYSTEM AND METHOD

BACKGROUND OF THE INVENTION

1. Field of the Invention

The present invention relates to the preliminary processing of documents which reflect business transactions and particularly to the correction of data commensurate with information entered by hand on documents evidencing retail sales, the documents having been initially processed by optical character recognition apparatus. More specifically, this invention is directed to optical character recognition systems for reading, correcting and preliminarily processing data, including handprinted information, from documents pertaining to retail sales transactions. The present invention also encompasses uniquely formatted documents for use by such merchants. Accordingly, the general objects of the present invention are to provide novel and improved methods, systems and documents of such characters.

2. Description of the Prior Art

While not limited thereto in its utility, the present invention is particularly well suited for use in the field of "remittance processing", i.e., in the recovery and initial processing of information entered on documents which are completed at the time a charge card holder enters into a retail transaction with a merchant. The exceedingly high volume of such transactions, coupled with the desire to minimize the time between the transaction and the charging and/or crediting of the dollar amount thereof to the appropriate accounts, imposes the requirements of speed and accuracy on the systems and techniques for processing the related documents.

Optical character recognition (OCR) apparatus has previously been used in "remittance processing" to read information from documents of the type alluded to above. The prior art OCR systems were capable of "reading", with an acceptable speed and low rejection rate, machine printed information found on documents completed at the time of retail sales. Prior OCR apparatus could not, however, recognize handprinted information, such as dollar amounts, at an acceptably low rejection rate with the requisite document through-put rate. Accordingly, the conventional prior technique has been to capture an image of the entire portion of each document being processed where a dollar amount might be entered by hand. These images were then presented to an operator sitting at a video display terminal (VDT) so that the amounts represented by the images could be visually observed and key entered thus creating a complete data record for each document. These document data records included the machine read information, such as an account number, and the dollar amount which was key entered. It has, in the prior art, often been necessary to key enter additional handprinted information, such as the date of the transaction, and such key entry of information was also necessary when the OCR apparatus could not read the essential machine printed information on the document. Obviously, the speed of document processing could be increased and/or the number of VDT terminals could be reduced if the need to key enter information for every document being processed could be eliminated.

Optical character recognition apparatus capable of recognizing handprinted characters with a high degree of accuracy is known in the art. Such apparatus, however, is generally characterized by a document through put rate which would be unacceptably slow for use in the field of "remittance processing". However, less sophisticated OCR apparatus, particularly apparatus which attempts to recognize characters by simultaneously matching data derived from the scanning of the characters with comparable stored data, i.e., template masks or models, commensurate with know characters, is capable of operation at a speed suitable for "remittance processing". This capability, however, has not previously been employed because characters have not been entered on the retail sales drafts and related documents with sufficient care as to location and/or character formation to ensure an acceptably low rejection rate. Since OCR apparatus must read a character by looking for variations in contrast, i.e., a dark trace against a light background, it has been the prior practice to attempt to guide the location and formation of characters on documents through the use of "fade out" boxes, i.e., rectangles printed in a light color on a white background, the light color not interfering with the operation of the scanner in the OCR apparatus. Use of such "fade out" boxes has not proven to be successful in constraining either the size or location of handprinted characters on documents completed at the time of retail sales transactions.

As noted above, it has been the previous practice to capture an image of the entire "field" in which a dollar amount will be entered on a sales draft document or the like. This field will typically have a minimum length of at least six character spaces and may also include a further space for the decimal point between the dollars and cents portions of the field. In most cases, the dollar amount actually entered on the document comprises fewer than six characters. The captured dollar amount field image, which is subsequently digitized, thus contains unnecessary information, i.e., the blank character spaces, in the prior art. The necessity of transmitting and processing such unnecessarily long digitized image records slows down the operation of the system.

SUMMARY OF THE INVENTION

The present invention overcomes the above-discussed and other deficiencies and disadvantages of the prior art and, in so doing, provides a novel and improved system and technique for the processing of documents, particularly documents which pertain to retail sales transactions. The present invention also encompasses novel documents for use with such system and technique. A sales draft document in accordance with the present invention is designed so as to constrain the user thereof to print characters within the confines of precisely defined character spaces located within a field. This is accomplished by defining the character spaces as uncolored "windows" within a heavy, dark, solid colored band, i.e., if the user prints outside of the window, he or she will be unable to visually perceive the printing. The documents of the invention are multi-page and the lowermost page which will be machine read, does not include any character space delimiting indicia in the field to be read. The document copy to be processed by the OCR apparatus does, however, include a machine readable code which will tell the apparatus precisely where the fields of interest, i.e., the series of unbounded character spaces, are located. Experiments have shown that this technique results in a sufficiently high percentage of the dollar amounts handprinted on the documents being formed with adequate care so that the entire dollar amounts are recognizable by OCR apparatus which operates by matching data commensurate with each character to data commensurate with a template mask or model corresponding to plural known characters, the comparison being done in parallel fashion.

In accordance with a preferred embodiment of the present invention, the captured field images are "truncated", i.e., are limited to the recognized field size. Restated, blank spaces, particularly blank spaces in the dollar portion of an amount field, are deleted and thus do not comprise part of the digitized record of the captured field image.

A particularly novel aspect of the present invention comprises the "tagging" of images as "rejects", i.e., unrecognized, and as dollar amounts and the subsequent storage of such tagged image records as a function of their nature. Thus, by way of example, each digitized dollar amount image will be formatted such that its preamble includes a code or pointer which indicates that it is in fact a dollar amount image. In addition, in each case where all of the characters comprising the dollar image have not been recognized, the image preamble will include a second code or pointer which indicates that it is a reject. A data record will be generated for each document being processed and that data record will indicate whether, for the corresponding document, an image record exists and, if so, whether a reject image record also exists. The document data record, dollar amount image records, and reject image records are separately stored, i.e., separate files are provided. Only the reject images are displayed at a VDT terminal for key entry of the visually observed amount, i.e. the amount which the OCR apparatus could not recognize. The key entry of the amounts from the display of the reject images results in the updating of the document data record for the corresponding document by insertion of the key entered amount therein. When the "correction" of all reject images has been completed, each account is checked to determine whether it is in balance. Only in those cases where the account is not in balance, as indicated for example by the total indicated by a merchant for a group of sales drafts not equaling the computed total of the actual amounts on those sales drafts, the images from the dollar amount image file will be displayed along with the dollar amounts from the data records so that the operator may make a comparison and key enter any further adjustments.

BRIEF DESCRIPTION OF THE DRAWINGS

The present invention may be better understood and its numerous objects and advantages will become apparent to those skilled in the art by reference to the accompanying drawing wherein:

FIG. 5A is a copy of a merchant's copy of a typical sales draft which is employed in the practice of the present invention;

FIG. 5B is the cardholder copy of the document of FIG. 5A;

FIG. 5C is the bank, i.e. machine readable, copy of the document of FIG. 5A;

FIGS. 6-1 and 6-2 are a block diagram of the scanner subsystem of apparatus accordance with a preferred embodiment of the invention;

FIG. 10 is a block diagram of the editing subsystem which implements the processing represented in FIGS. 8 and 9;

FIG. 11 is a representation of a data record for the document of FIG. 4B as generated by the editing subsystem; and FIG. 12 is a representation of a data record for the document of FIG. 5C as generated by the editing subsystem.

DESCRIPTION OF THE DISCLOSED EMBODIMENT

Figure 1:
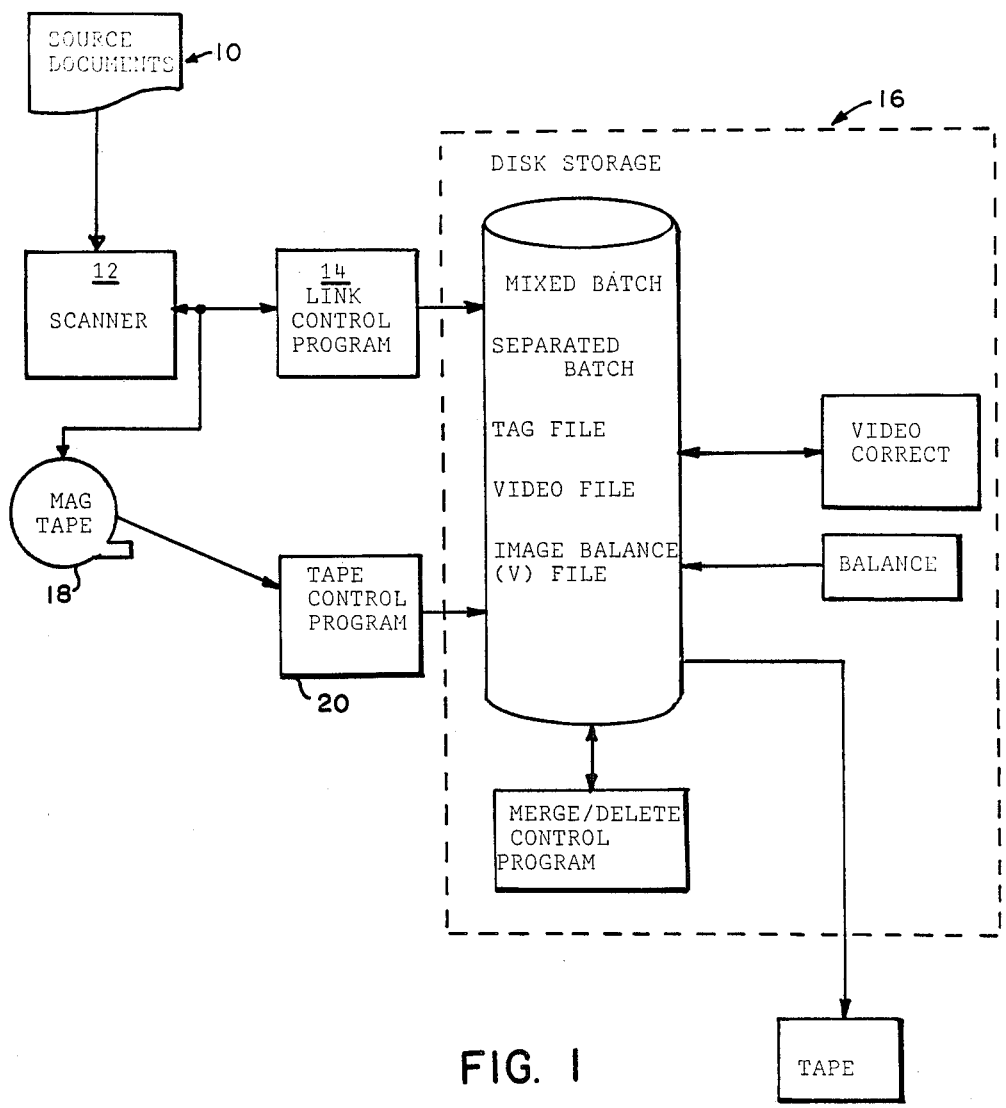
FIG. 1 is a general system block diagram of apparatus in accordance with the invention, the apparatus including a scanner subsystem and an editing subsystem.

With reference to FIG. 1, documents which are to be processed in accordance with the present invention are initially "batched", i.e. are arranged in a logical sequence which will be discussed below. A batch may function as a source of, for example, up to 2,000 documents. These source documents, indicated at 10 in FIG. 1, are delivered to a scanner subsystem 12. As will be described in more detail in the discussion below of FIGS. 6 and 7, the functions of the scanner subsystem include image capture and subsequent digitization, character recognition, image encoding and generation of data records. The encoding preferably includes compression of digitized images. The scanner subsystem thus includes data processors and associated memories. The scanner subsystem also includes a serializer for imprinting serial numbers on the documents and a camera, a microfilm camera for example, for capturing and storing images of one or both sides of the serialized (numbered) documents. The scanner subsystem further includes a document transport for moving the batched documents individually and serially through an image capture module and the serializer and camera. The document transport comprises a feeder section, a transport section and document stackers located downstream o the camera. If deemed necessary, the scanner subsystem can also include an input/output device which will provide hard copies of "reports" containing information concerning the stream of documents being processed.

The signals outputted by the scanner subsystem are delivered, via a data link 14, to an editing subsystem which has been indicated generally at 16. The editing subsystem 16 includes provision for storage, "correction" and preliminary processing, i.e., account reconciliation, of the digitized information transmitted via the data link 14. For the reasons to be explained below, the data storage in the editing subsystem will establish a plurality of separate files as indicated on FIG. 1. The transmitted information for a document, in the embodiment being described, will include a data record and may also include an image record. In accordance with the invention, the images comprising a document image record may be of a portion of the "field" or "fields" of interest only, i.e., only those parts of the areas of the document where relevant data appears or should appear will be imaged and digitized. In the case of dollar amounts comprised of hand-printed characters, the images will be "tagged" either as completely recognized or as reject, i.e., unreadable, images. A dollar amount image, regardless of whether it is recognized or a reject, will be comprised of that portion of the amount field, beginning with the least significant digit, which includes characters or the like.

It is to be noted that, either alternatively or as a backup, the data outputted from the scanner subsystem 12 may be recorded on a magnetic tape 18 or other suitable storage medium and the record then physically moved to the editing sub-system and the recorded data transferred thereto under the supervision of a tape controller 20 or the like.

Figure 2:
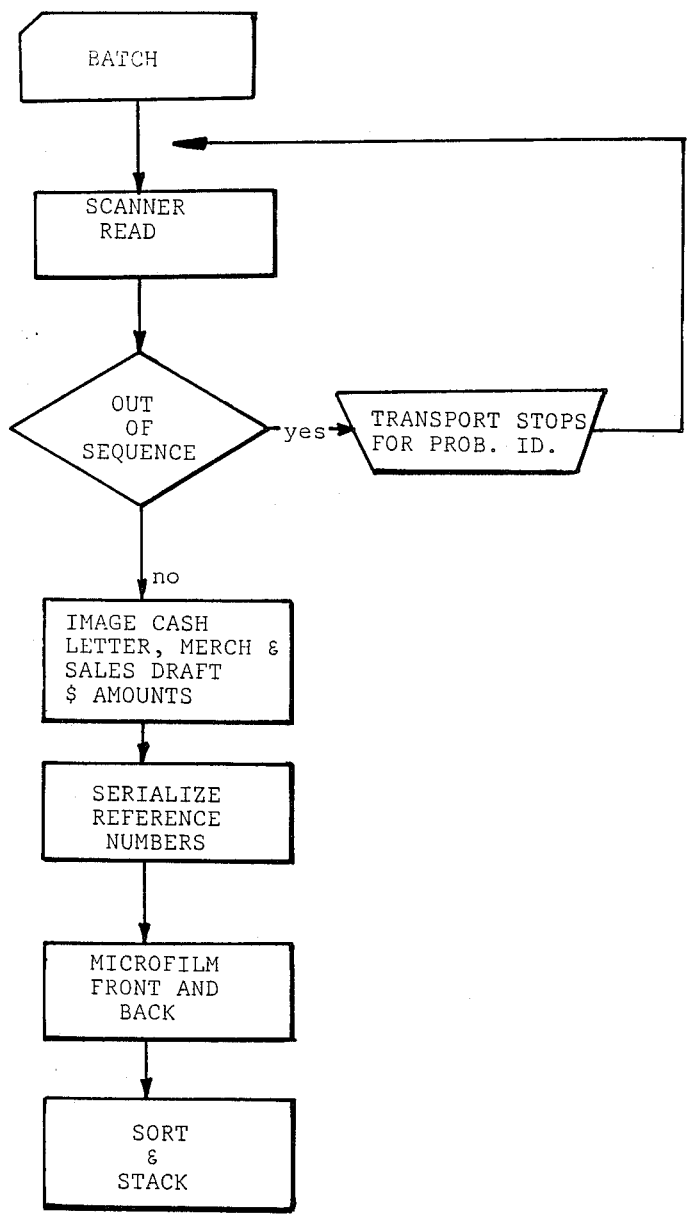
FIG. 2 is a generalized flow diagram for a document scanner subsystem in accordance with a preferred embodiment of the invention.

FIG. 2 depicts the flow of the documents to and through the scanner subsystem 12 of FIG. 1. As noted above, the documents are batched and then serially transported through the scanner where they are "read". The scanner will read, but will ordinarily not capture an image of, machine printed information on each document. This machine printed information will include indicia which identifies the document by type. In the simplified example to be described below, the document types will comprise block headers, deposit transmittals and sales drafts. Other document types such as cash letters, cash advances and credit vouchers can also be included within a batch and processed. In order to achieve maximum efficiency, these document types must be read in the correct sequence. By comparing the type identification of the document being read with that of the previously read document, the scanner subsystem can determine if the documents have been arranged in the correct order. If the documents are out of order the transport will be stopped for problem identification. The scanner, particularly the image capture device therein, is controllable so as to permit the imaging of "fields" on the document. Depending on document type, a "field" may be provided for an account number, date, an authorization, a transaction type identification code and a dollar amount. With the exception of the account number and transaction code, the data in these fields will typically be inserted by hand. The captured images are digitized and transmitted to recognition logic which will be described in more detail in the discussion of FIGS. 6 and 7. The document, after having been "read", will be imprinted with identification numbers which are serialized. The entire document, with the serial numbers imprinted thereon, will subsequently be microfilmed or imaged in some other suitable manner. The documents, after microfilming, will be transported to a document stacker and, subsequent to stacking, will be removed from the system for storage and ultimate disposition.

As noted above, the recognition logic and associated devices which comprise the scanner subsystem will generate a data record and may also generate an image record, i.e., digitized and compressed data commensurate with the images of scanned fields, for each document which is read. A document data record may include information commensurate with an account number, the type of document, the type of transaction, a dollar amount, the assigned serial number, an amount image pointer or pointers, the date and the results of various tests. As will be described in greater detail below, an amount image pointer will be a multibit flag which identifies where the image corresponding to the amount portion of the data record is stored.

Figure 3:
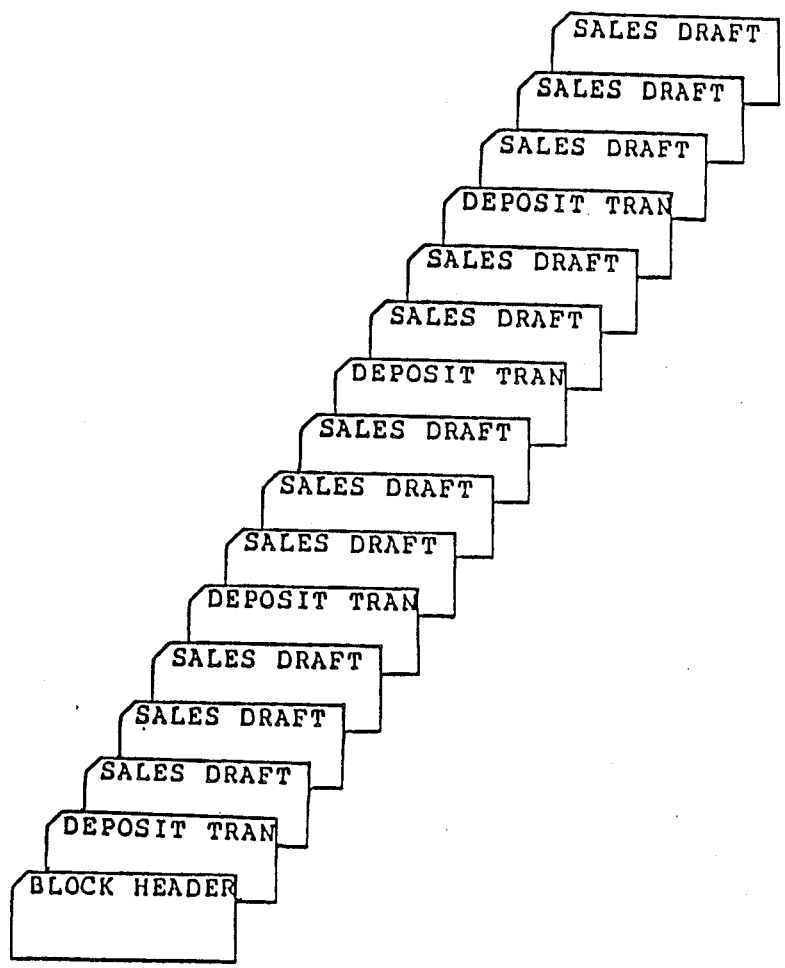
FIG. 3 is a schematic representation of the manner in which documents to be scanned in accordance with the technique depicted in FIG. 2 may be batched.

FIG. 3 represents a manner in which documents might be batched for processing in accordance with the disclosed embodiment of the present invention. Each batch begins with a control document, i.e., a "block header". The reading of a block header document controls the opening and closing of batches. A block header typically carries a batch number, an employee number, the date and possibly a department number. If a field where this identifying information should be present is blank on the block header, or if the characters in the field cannot be recognized, the processing of the document data record by the editing subsystem will result in an operator being prompted to key enter the information appropriate to the blank field. In actual practice a cash letter document is usually the second document in a batch and can be found anywhere else within the batch. The cash letter document, which will not be discussed in detail herein, will typically be prepared by a local financial institution where the merchant that has engaged in the sales represented by the deposit transmittal and sales drafts which will follow in the batch until the next cash letter is encountered, has its account. A cash letter will, as in the case of a block header, be identified by indicia imprinted thereon and when this indicia is read the cash letter document will function as a control document. The cash letter will be an order for the entity processing the documents, typically a regional bank, to credit, to the account of the financial institution that has forwarded the batched documents for processing, an amount which has been entered in a field on the cash letter.

Figure 4A:
FIG. 4A is a copy of a merchant's copy of a typical deposit transmittal form which is employed in the practice of the present invention.
Figure 4B:
FIG. 4B is the bank, i.e. machine readable, copy of the form of FIG. 4A.

The next document in a batch, and the first document following the block header in the simplified example to be explained herein, will consist of a deposit transmittal form which is completed by a merchant. In actual practice a batch will include many deposit transmittals with each such deposit transmittal being followed by a plurality of sales drafts. FIG. 4 is a copy of an example of a summary document, i.e., a merchant's deposit transmittal form with FIG. 4A being the MERCHANT COPY, i.e., the copy which is retained by the merchant. FIG. 4B is the "BANK COPY" of the deposit transmittal and is the copy which will be included within the batch. It is to be understood that the deposit transmittal of FIG. 4 will customarily be imprinted with the merchant's identifying number in a field located adjacent the upper left corner of the document. There will be space on the back of the deposit transmittal for the merchant to prepare a record of sales transactions in excess of those which will fit on the front of the form. In actual practice, the merchant may simply submit the deposit transmittal, with the total dollar amount entered by hand, along with an adding machine tape which lists all of the sales drafts which accompany the deposit transmittal. It is also to be noted that a sales draft document may function as a record of a sale, a return (credit) or a cash advance depending on a transaction code which is imprinted thereon. The totaled amount of all of the transactions reported will be entered in the amount field located adjacent the lower right corner of the deposit transmittal. As may be seen from FIG. 4A, the field in which the merchant enters the net amount is defined by a rectangular band of solid dark color which is interrupted by "windows" in which the characters are to be written. It has been found that the provision of such "windows" within a dark field constrains users to placing numerals entirely within the windows and also promotes care in the formation of the numerals. Previously, in the remittance processing art, users were often requested to print within "fade-out" boxes, i.e., within rectangles defined in a color which would not interfere with the OCR apparatus finding and imaging the printed character. Conventional optical character recognition equipment is responsive to differences in contrast, particularly dark indicia on a light background, and thus cannot read the merchant's copy of the deposit transmittal document of FIG. 4A, i.e., the OCR apparatus would attempt to read all of the dark areas of the field. The use of "fade-out" boxes has not resulted in a sufficiently large percentage of hand printed characters being located or formed with the degree of care which is requisite to machine reading at high speed with an acceptable degree of accuracy.

As may be seen from FIG. 4B, the copy of the deposit transmittal which will be processed by the scanner subsystem does not include the dark colored field. To the contrary, the copies of the hand written numerals produced by the carbon paper which is interposed between the "MERCHANTS COPY" and "BANK COPY" will be in an area of the document which includes, in the example being described, a decimal point as the only preprinted indicia. The decimal point may, however, be eliminated since it functions only as a check and/or a locating mark. The "BANK COPY" of the deposit transmittal will also have the merchant's identification number, which is typically machine printed, in the field at the upper left corner of the document. The "BANK COPY" will customarily also include, adjacent the lower left hand corner thereof, a preprinted code. This code will identify the form which comprises the document. Each form employed is unique to a document type and identifies a document by size and the location of the field(s) thereon which are to be read. The image capture device will begin to scan the deposit transmittal at the upper left hand corner. If the preprinted identifying number (merchant account number) can be read, since this number includes a prefix which defines the nature of the document, the scanner subsystem will know what type of document is being processed. The lower left corner will also be read to verify the document type and to identify where on that document the fields which should contain the information of interest, for example the merchant entered total amount, will be found. The scanner can thus locate and begin to scan the unbounded amount field starting from right to left, i.e., the least significant digit will be located and read first.

If the merchant account number cannot be completely read, i.e., if all of the characters can not be captured and recognized, then all or a portion of the field including this number will be imaged. However, if the merchant account number field is blank, for example if the merchant has inadvertently used a sales draft document instead of a deposit transmittal document, the field will not be imaged and the scanner subsystem will output blanks for the corresponding portion of the data record. An unrecognizable or blank account number field will subsequently be "corrected" in the manner to be described below. The relevant portion of the amount field will be imaged regardless of whether all of the characters which have been entered therein have been recognized.

Figures 5A, 5B, 5C:
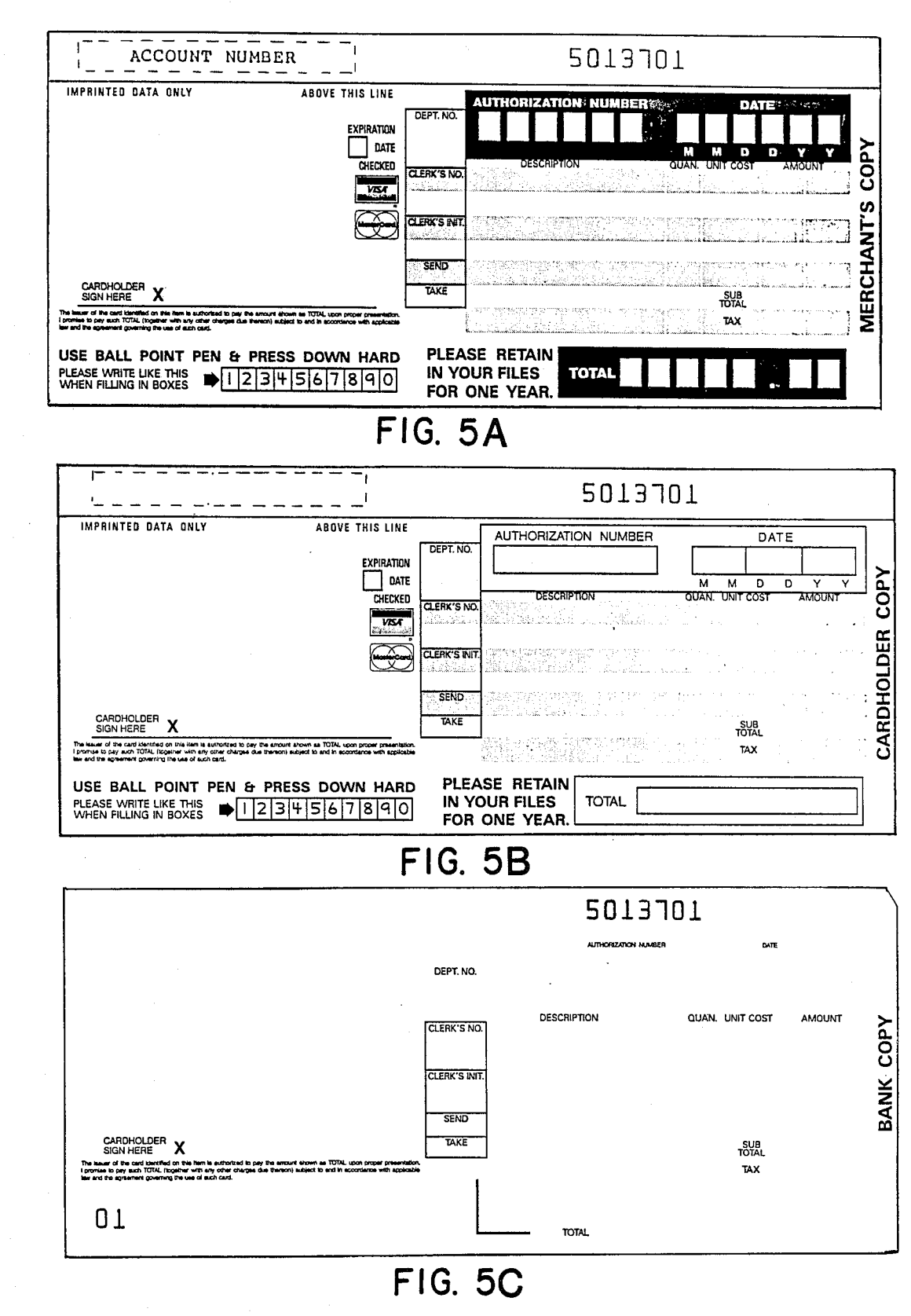

One or more sales drafts, i.e., individual transaction documents, will immediately follow the deposit transmittal (summary) document in the batch. FIGS. 5A, 5B and 5C respectively depict the merchant, cardholder and bank copies of a sales draft document in accordance with the present invention. The sales draft document is formatted in essentially the same manner as the deposit transmittal document, i.e., those areas in which information is to be entered by hand are delimited by a heavy solid dark color band with windows and the copy of the document which will be processed will, in the amount field, include no more than the preprinted decimal point or, possibly, some other locator mark. The sales draft may be provided, in addition to the account number and amount field, with fields for entry of an authorization number, the date, and a description of each individual purchase. The sales draft will also have imprinted thereon, typically to the right of the account number field in the upper right corner, a transaction code number. The cardholder's identifying (account) number will, in the conventional manner, be mechanically transferred to the sales draft document account number field when it is employed.

The manner in which documents are read in accordance with the invention is as follows. Firstly, the field at the upper left corner is scanned, typically left to right. This field should contain a control number or an account number. If a control number is found, i.e., if the document is a block header or cash letter, the scanner subsystem will generate a data record which comprises control information for the editing subsystem. If a merchant account number is read, the subsystem will perform in the manner described above with respect to a deposit transmittal document. If a document does not contain a control number or merchant account number, it must either be a sales draft, credit voucher, cash advance or an unknown document type. If the document is a sales draft, and presuming for purposes of explanation that there is only one type of sales draft document, the cardholder number will be read. The cardholder number, i.e., the account number, will also identify the account type, i.e., VISA, MASTER CARD, AMERICAN EXPRESS, etc., this information being encoded in the cardholder's individual account number. The cardholder account number field is located in the same place on a sales draft as the merchant account number is imprinted on a deposit transmittal, i.e. in a field which extends horizontally from the upper left corner. If the account number field is blank, the subsystem will output blanks and an attempt to "correct" the blank account number field will be made during subsequent processing. If the account number cannot be successfully read, i.e., all significant digits recognized, the account number field will be completely or partly imaged, as will be described below, and an attempt will be made to "correct" the document data record via the editing subsystem.

Continuing with a general discussion of the scanning of a sales draft document, a portion of the date field, namely the month and day, will be scanned. If either the day or month field has only a single digit, the system will automatically enter a zero for the leading digit. The month and the day will be sequentially checked for the presence of valid information, i.e., a test will be made to insure that the month information entered is between 01 and 12 and that the entered day information is between 01 and 31. If the date is invalid or has not been filled in by the merchant, the scanner subsystem will output blanks and the date will be "corrected" during subsequent processing. If date "correction" is desired, an image capture may be performed on the date field. The date output will have four characters.

The amount field will also be scanned, preferably from right to left, and an image of any amount entered therein will be captured for possible later use. If the amount field is blank, i.e., contains no machine or hand-printed indicia, the field will not be imaged and the scanner subsystem will output blanks. If there is indicia within the amount field, and if all of the characters cannot be recognized, the amount will be "corrected" during subsequent processing. It is to be noted that the amount field is of variable length, i.e., is comprised of up to seven digits in the example being described. In order to maximize efficiency by minimizing scanning time, the scanning of the amount field will be automatically limited. By way of example, upon scanning of two successive blank character spaces after the second character space, i.e., to the left of where the decimal point should be located, the logical end of the field (EOF) will be deemed to have been have been reached and scanning will be terminated. Thus, in accordance with the invention, images are truncated to the recognized field size and it may not be necessary to scan the entire amount field. Accordingly, document processing will proceed at the fastest possible rate.

With regard to the authorization number, the field will be scanned only to determine if a number is present and, if so, a "one" will be outputted at the appropriate point in the data record. Otherwise, the scanner subsystem will output a zero.

Figures 1, 6:
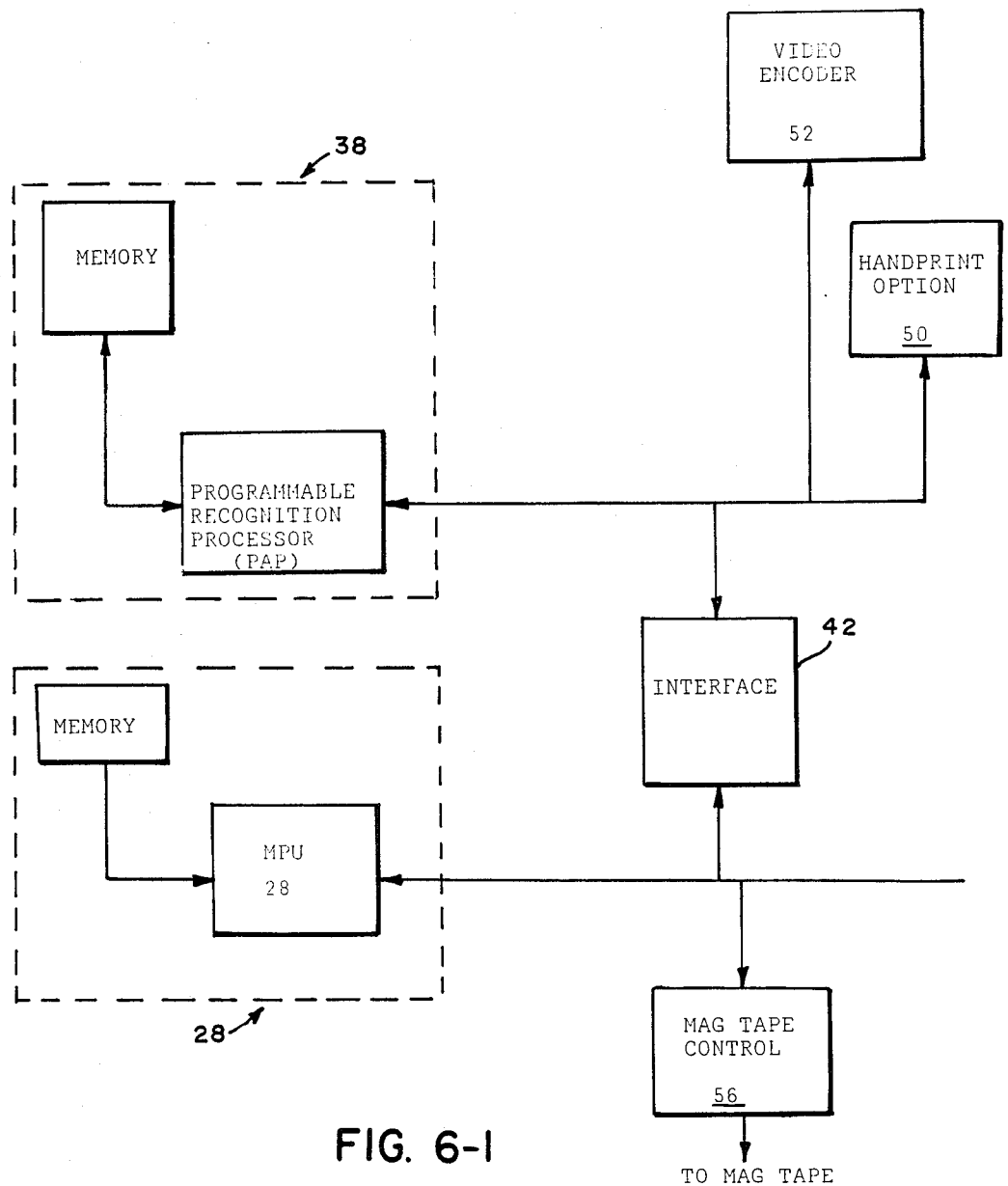
Figure 6:
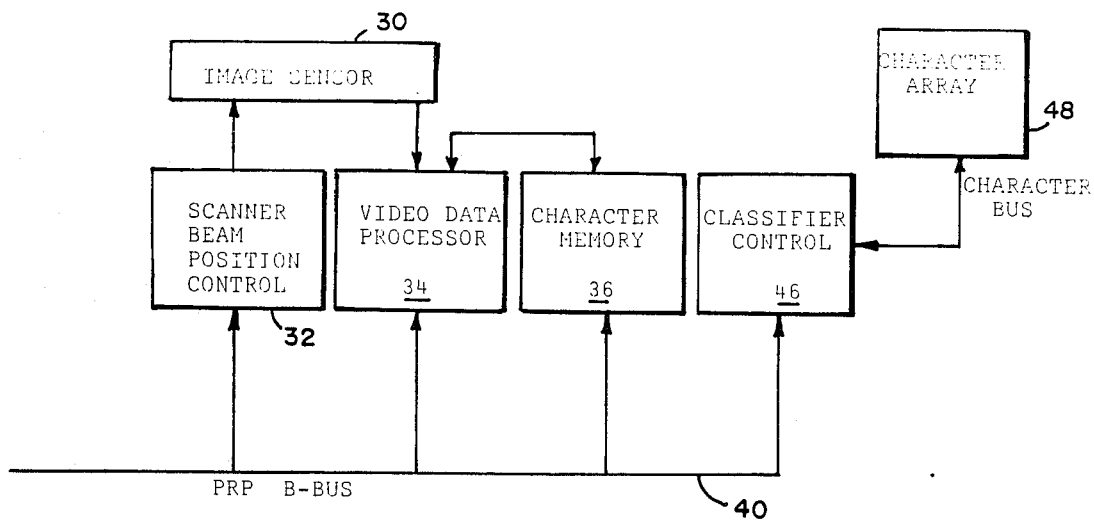
Figure 2:
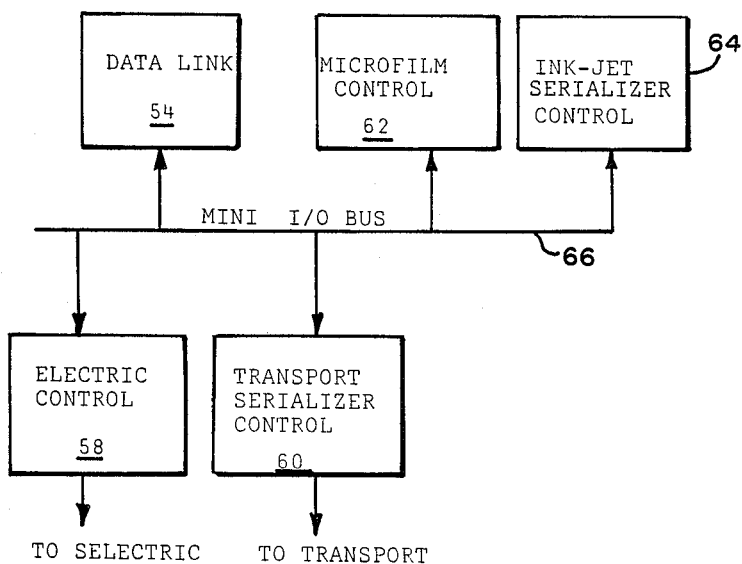

Referring now to FIG. 6, a scanner subsystem in accordance with a preferred embodiment of the present invention is depicted in block diagram form. Some of the components of the scanner subsystem, the computer controlled document transport for example, have not been represented on FIG. 6 in the interest of facilitating understanding of the invention. The scanner subsystem operates under the control of a computer 28. It should be understood that, in the conventional manner, the documents to be processed are serially delivered, from a feeder via the document transport, into registration with an image sensor 30. The scanner subsystem will "find" three of the four edges of the document and will thus determine the document size. Image sensor 30 may comprise an image dissector tube which will scan, under the supervision of a scanner beam position control 32, the document read areas or fields. Once a locator mark such as the account number on the document being read has been detected, the scanner beam position control 32 will, pursuant to commands generated by computer 28, cause the image dissector tube to scan the areas of interest of the document and in the appropriate manner, i.e., right to left or left to right. Such controllable scanning of documents is conventional in optical character recognition apparatus.

The image sensor 30 will, during scanning, provide an analog output signal commensurate with the contrast variations in the character spaces comprising the field of the document which is being read. This analog signal is inputted to a video data processor 34 which converts the analog signal from the image sensor to digital data. This digital data is delivered, via a video data interface included in video data processor 34, to a dynamic random access character memory 36. Character memory 36 may be a small line memory. The writing of data to the character memory is in response to commands provided by a recognition processor 38 via a bus 40. Recognition processor is itself controlled by computer 28 and is coupled thereto by interface 42. Recognition processor 38 provides "reset" and "start" commands for the video data interface and generates the coordinates where the captured and digitized data will be stored in memory 36. Memory 36 may be generally of type of system described in U.S. Pat. No. 4,120,049. The recognition processor 38 will comprise a micro-programmable general purpose micro-computer.

The recognition processor 38 also provides the commands which control the operation of a classifier control 46. Control 46 attempts to match the data commensurate with each character which has been read, as stored in memory 36, with data, i.e., template masks or models, commensurate with known characters as stored in a character array 48. In one reduction to practice character array 48 comprised ninety-six (96) programmed gate arrays. Thus, each individual gate array contained information identifying the shape of a number or letter to be recognized, there being several alternate shapes for many characters. Depending on the character recognition technique which is implemented, the shape information stored in the gate arrays may, for example, be in the form of edge coding or "move" vectors relative to a defined coordinate system. Data commensurate with a character which has been read is simultaneously, i.e., parallelly, compared with the models stored in all the gate arrays. Whenever a match is made, a match being defined as the highest "score" exceeding a minimum value, the character will be deemed to have been recognized. If a character is recognized, digital data commensurate with its identity will be temporarily stored in the memory of recognition processor 38. If a character is not initially recognized, it may be rescanned and/or resubjected to comparison testing a preselected number of times. If the system is unable to recognize a character, recognition processor 38 will generate a code which will cause the image of the field or character space in which the unrecognizable image resides to be tagged as a "reject".

The scanner subsystem may, if permitted by the requirements for document processing speed, include a "handprint" option 50. If the handprint option 50 is employed, many of the characters which cannot be recognized in the manner described above, which is capable of exceedingly high speed operation, can nevertheless be recognized. The handprint option, if employed, will be operated under the control of processor 38 and may be of the type disclosed in U.S. Pat. No. 4,628,532, entitled "ALPHANUMERIC HAND PRINT RECOGNITION", which is assigned to the assignee of the present invention.

The scanner subsystem will also include a video encoder or formatter 52 which may implement a run-length encoding algorithm. The image sensor 30, as is conventional in optical character recognition, scans the characters to be read vertically, i.e., the scanning pattern is a vertical raster. In order to present images of the scanned characters to the operators of video display terminals which comprise the, editing subsystem, the data commensurate with any images which are captured must be converted into a horizontal raster. The encoder 52 functions as a shadow memory for character memory 36 with data being read out of the shadow memory on a horizontal raster basis. This data may then be compressed pursuant to the run-length encoding algorithm, i.e., encoder 52 outputs "words" commensurate with a color/length code. The output of encoder 52 is stored piece-by-piece in the memory of recognition processor 38 for subsequent use in the formation of image records, which include a preamble, for the document by computer 28. The image records, and the digital information which comprises the data record for each document, is read out of the memory of computer 28 and transmitted, via data link 54, to the editing subsystem. The data link 54 will comprise digital logic which handles protocol on the data transmission link.

The scanner subsystem 12 of the disclosed embodiment also includes a magnetic tape control 56, a printer control 58, the transport control 60, a microfilm camera control 62 and the serializer control 64. All five of these controllers are connected, via input/output bus 66, to computer 28 which provides the commands to control the sequencing of the operations of the various controllers. These controllers are all conventional components of commercially available optical character recognition apparatus and will not be described further herein.

Figure 7A:
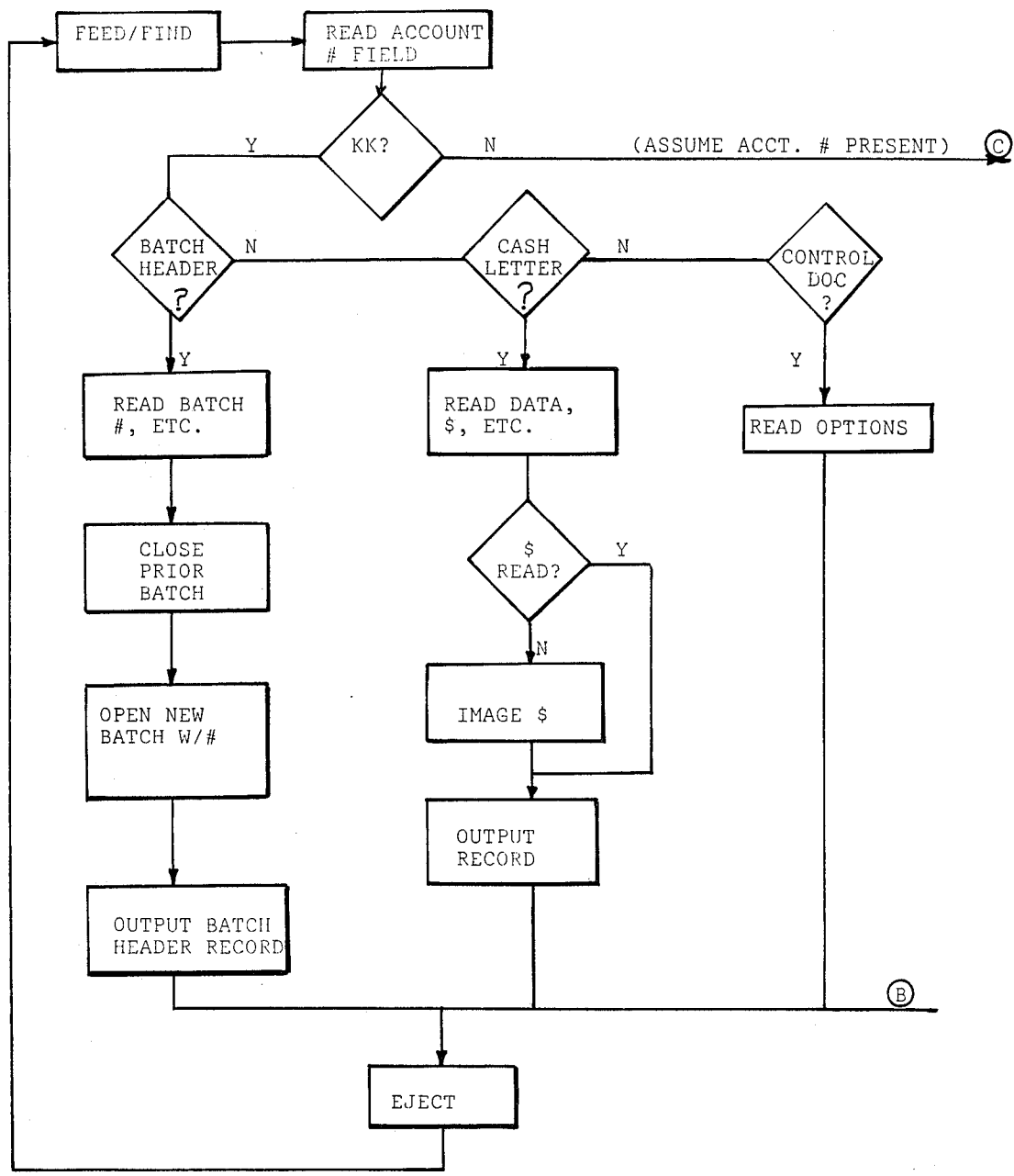
FIGS. 7A, 7B and 7C are a detailed flow chart for the scanner subsystem of FIG. 6.
Figure 7B:
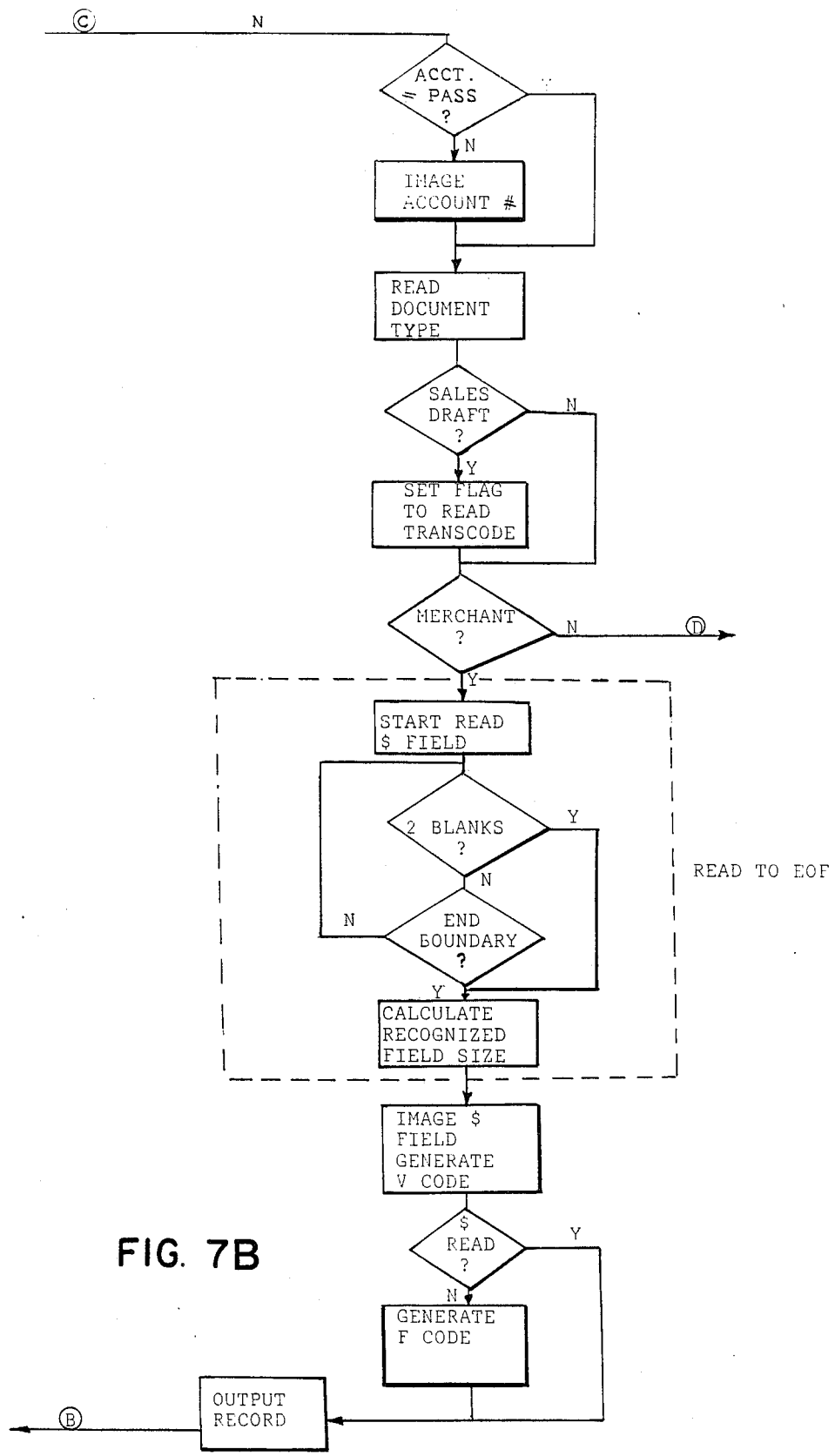
Figure 7C:
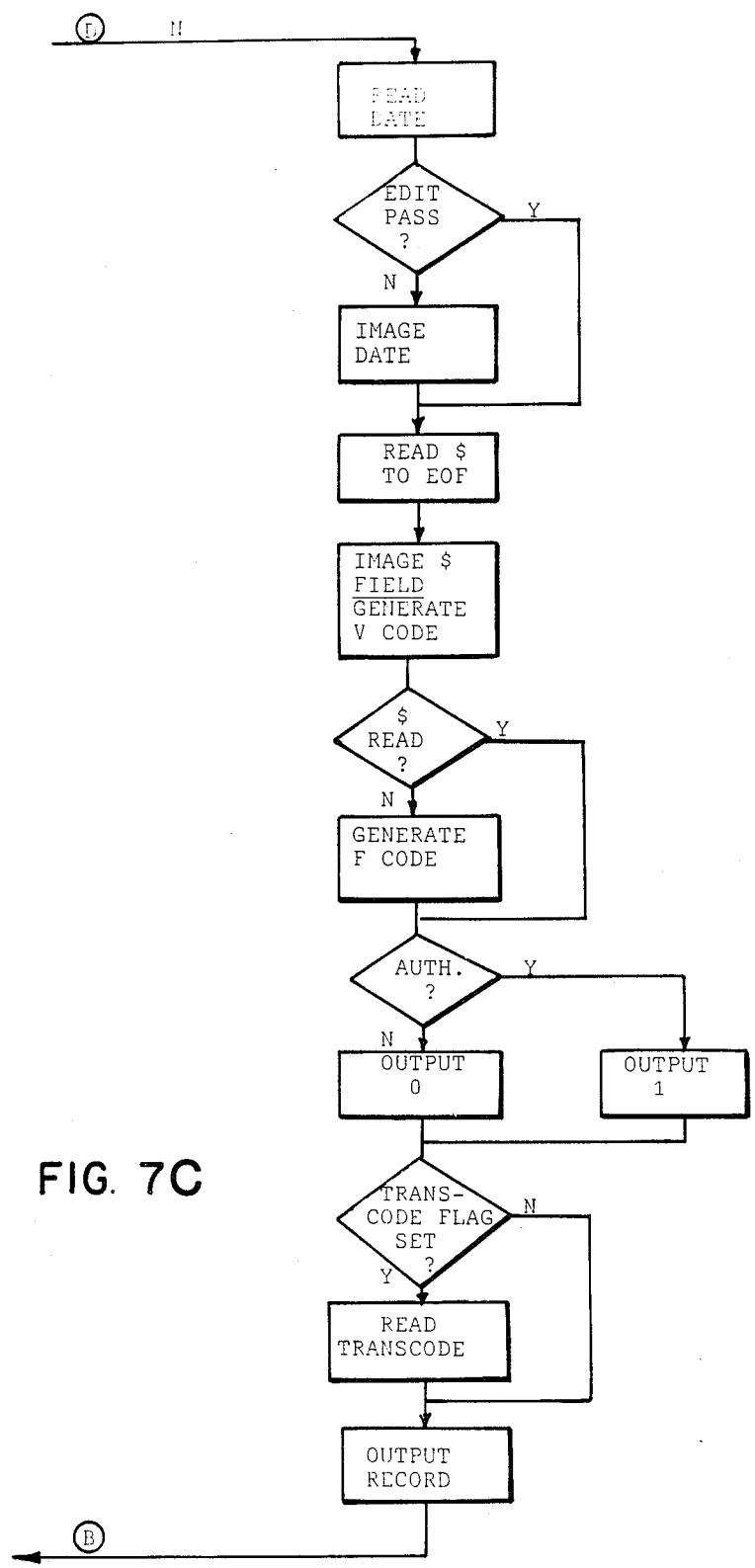

It is believed the operation of the scanner subsystem of FIG. 6, particularly the features whereby it may be distinguished from the prior art, will become obvious to those skilled in the art by reference to the flow diagram comprising FIG. 7. It is to be noted that FIG. 7 is a general information flow diagram which does not detail those procedures performed under the control of main computer 28 and recognition processor 38 which are presently implemented in commercially available optical character recognition apparatus. As discussed above, batched documents delivered to the apparatus of the present invention will be serially fed to the image sensor and the edges thereof found. Scanning of each document will then begin in the upper left hand corner where a control number or account number field is located. Since control and account numbers customarily will be machine printed, in most cases information in the first scanned field will be machine readable. In the case of a block header, cash letter or other control document, the field will include a control, i.e., KK, character or characters. Thus, operating under the control of computer 28, a test will be first conducted to determine whether or not a "KK" code is present, i.e. whether the recognition processor 38 has received and stored data commensurate with a control "number". If this test is answered in the affirmative, a further test will be conducted to determine whether the document being read is, as identified by the KK code, a block header. If the document is a block header, the information contained thereon, including the batch number, will be read. As mentioned above, if any necessary information on the block header can not be read, an image capture will be performed and a flag will be set to instruct the edit process that image correction is required via the editing subsystem. The reading of a new batch number will cause the closing of the previous batch and the opening of a new batch with the new batch number. The block header record and any associated image data will be outputted to the edit subsystem. At this time, if the document was a block header, an eject command will be generated and the next document in the batch will be fed into position for reading.

If the document contained a KK code but was not a block header, the next test conducted will be to determine whether the document is a cash letter. If the document is a cash letter, as identified by its control number, computer 28 will send the appropriate commands to recognition processor 38 so as to cause the serial scanning of the fields of interest which will typically include the date and the dollar amount. All information on a cash letter will customarily be machine printed and thus should be machine readable. If all characters comprising the dollar amount are read, a cash letter data record will be outputted. If for any reason all of the characters comprising the dollar amount on the cash letter cannot be recognized, the relevant portion of the amount field will be imaged and this image will be outputted to the edit subsystem along with the data record for the document. If it is necessary to image the cash letter dollar amount field, the image will be encoded by means of encoder 52 in the manner described above. Also, in the manner to be discussed below, only that continuous portion of the amount field which includes pertinent data will be imaged, i.e., the system will delete unused spaces at the left end of the field and will capture only that information which is perceived to be present. When a cash letter data record is outputted, another eject command will be generated.

If the document contains a control number and is neither a block header nor cash letter, it will be some other type of control document. The "instructions" or "options" which the system will perform in response to the reading of such another control document will be read from the memory of computer 28, a data record will be generated and outputted and an eject command generated.

If the document does not include a control number in the account number field, the system will presume that an account number is present. Account numbers are formatted, i.e., number of digits, grouping and order, so as to identify the type of account, i.e., merchant or individual cardholder. A test will be conducted to determine if the account number is valid, i.e., the formatting of the number will be tested to ensure that it is commensurate with an account number, and to ascertain whether all of the characters have been recognized. If these tests are not passed, a portion or all of the account number field will be imaged. Thus, in one embodiment, if not more than two digits cannot be recognized by the system, images will be captured of only the individual character positions which correspond to the unrecognized numbers and the data commensurate with the recognized numbers will be preserved and will form part of the data record for the document. If the number is invalid, or if more than two characters are unrecognized, the entire field will be imaged. If an image is captured of all or part of the account number field, a "reject image" or "F" code will be generated and the image data will be "tagged" with this code, i.e., the code will form part of the preamble of the image record which will be transmitted to the editing subsystem.

After the account number has been tested, and the account number image field partly or completely captured if necessary, the document type will be read. That is, the document type field at the lower left hand corner of the document will be scanned and the number which appears there will be read. In the case of the deposit transmittal form of FIG. 4B, the document type is 08. In the case of the sales draft form of FIG. 5C, the document type is 01. The reading of the document type number is a check on the reading of the account number, i.e., if the account number cannot be read the document type number may nevertheless identify whether the document is a merchant's summary document or a record of an individual transaction by a cardholder. The document type number also tells the system the size of the document being processed in terms of columns and the location of the field or fields of interest on that document. In the case of the deposit transmittal form, the only additional field of interest is the "NET AMOUNT" which appears at the lower right hand corner. However, in the case of the sales draft form of FIG. 5, the fields of interest include the "TOTAL", "DATE" and "AUTHORIZATION NUMBER" and this information may appear at different locations on different forms.

After the document type number has been read, that number is tested to determine whether the document is a sales draft. If the document is a sales draft, a flag will be set. This flag will instruct the scanner subsystem to read a transaction code which is printed in a field typically located at the same level and to the right of the account number field.

The next test will be to determine if the document is in fact a merchant's deposit transmittal form. This test will be answered in the affirmative if the document immediately follows a cash letter or, in the simplified example of FIG. 3, immediately follows a block header and if the document includes either or both of an account number formatted in the manner of a valid merchant number or a document type identifier for a deposit transmittal form. If the document is a merchant deposit transmittal, the image sensor will be caused to scan the amount field. If all digits comprising the amount entered in the field are not read, the above-mentioned "F" code will be generated, an image of the amount field will be captured and that image will be "tagged" as a reject image by inclusion of the F code in the preamble of the image record. Regardless of whether all characters are recognized, that portion of the amount field which contains data will be imaged and a "V" code will be generated and included as part of the preamble of the transmittal image data. A reject image of an amount field will thus be "tagged" with both the "F" and "V" codes. In order to minimize the portion of the field which is imaged, thereby minimizing the length of the document image record and increasing the speed of the system, the amount field is scanned to the "end of field" (EOF). The scanning is preferably right to left and a flag will be generated indicating whether there is indicia present in the area provided for each character. The EOF is defined as two adjacent blank spaces in the dollars portion of the field. Thus, upon detection of two blank spaces in the dollars portion of the amount field, scanning of the field will be terminated, those two blank spaces will be deleted and the remaining portion of the amount field then imaged. Thus, unused spaces are deleted from the image record and only information which the character recognition logic perceives to be present will be captured. If the field is scanned to its actual end, as opposed to its logical end (the EOF), any blank spaces immediately before the actual end of the field will be deleted.

Once that portion of the amount field which is relevant has been imaged, the image records and associated data record for the merchant deposit transmittal document will be generated and outputted to the editing subsystem via the data link. Typically, the image information will be transmitted first. The end of transmission of all of the digitized images with their associated preambles for a document will prompt transmission of the data record for that document. The preamble of each image record will include the document number in the batch, this number being assigned sequentially by the scanner subsystem. The image record preambles will also identify the column(s) within the data record commensurate with unread numerals, i.e., a portion of an image record preamble will point to the field or character space in which the rejected character occurred. Referring to FIG. 11, which represents the final document record outputted by the editing subsystem for a deposit transmittal, the amount field comprises columns 52-61. The preamble will also include the number of characters which the image represents.

If the account number indicates that the document is not a deposit transmittal, i.e., the account number is not formatted in the manner of a merchant's number and/or if the document type code read from the field at the lower left corner of the document indicates that it is a sales draft, the image sensor will be caused to scan that portion of the date field commensurate with the day and month. As noted above, if the day and month data entered in the date field does not comprise two digits, the system will automatically output a zero as the leading digit. If the character recognition logic can read the date, as discussed above, an edit test will be conducted to determine whether the data which has been entered is valid. If this test is answered in the negative, or if the characters comprising the date cannot be recognized, the relevant portion of the date field may be imaged for later "correction".

After the "reading" of the date field, the image sensor will be commanded to scan the amount field in the manner described above with respect to a deposit transmittal document, i.e. the field will be read right-to-left to its "end" as defined by the absence of indicia in two consecutively occurring character spaces in the dollar portion of the field. An image of the relevant portion of the amount field will then be captured and the "V" code will be generated. This code will be included in the preamble of the image record. If all characters appearing in this field have been recognized, digital data commensurate with the amount which has been entered by hand on the sales draft document will be stored in the memory of computer 28 for use in forming the sales draft document data record.

The results of the recognition process will be looked at to see if, for each character space in the amount field which contains indicia, a number has been recognized. If any one (or more) characters have been flagged as not recognized, the "F" code will be generated for inclusion in the image record preamble and a field image will be captured. The preamble for a sales draft amount field image will thus include the document number within the batch, the "V" code, possibly the "F" code, a data record column number and the field length in number of characters. Referring to FIG. 12, which represents the data record which will be outputted from the editing subsystem for a sales draft rather than an image preamble, the amount will occupy columns 52-61. In the case of an unrecognized account number, if FIG. 12 did represent an image preamble, some or all of columns 14-29 would be identified in the preamble.

Next, the "authorization" field will be scanned solely to determine if an entry has been made therein. The result of this scanning will be the outputting of either a "one" or "zero" which will be included as part of the document data record.

After the authorization field on the sales draft document has been read, a test will be conducted to determine whether the transaction code flag was previously set. If this test is answered in the affirmative, the code will be read. The document data record will include an indication of whether the transaction code was read and, if so, the code. In the case of the document of FIG. 5, the transaction code is 5 which is indicative of a sales draft.

After the transaction code has been read, the image and data records for the sales draft document will be transmitted, via the data link, to the editing subsystem. The data record for a sales draft may include all or most of the cardholder's account number, the document number as assigned by the serializer, the date, the existence or absence of an authorization, the transaction code, the amount if recognized, image pointer(s) and numerous other bits of data which, as may be seen from FIG. 12, either classify the document or report the results of operations performed by the scanner subsystem.

As in the case of the information for a deposit transmittal document, the image record will be transmitted first and the completion of image transmission will prompt transmission of the data record.

Figure 8:
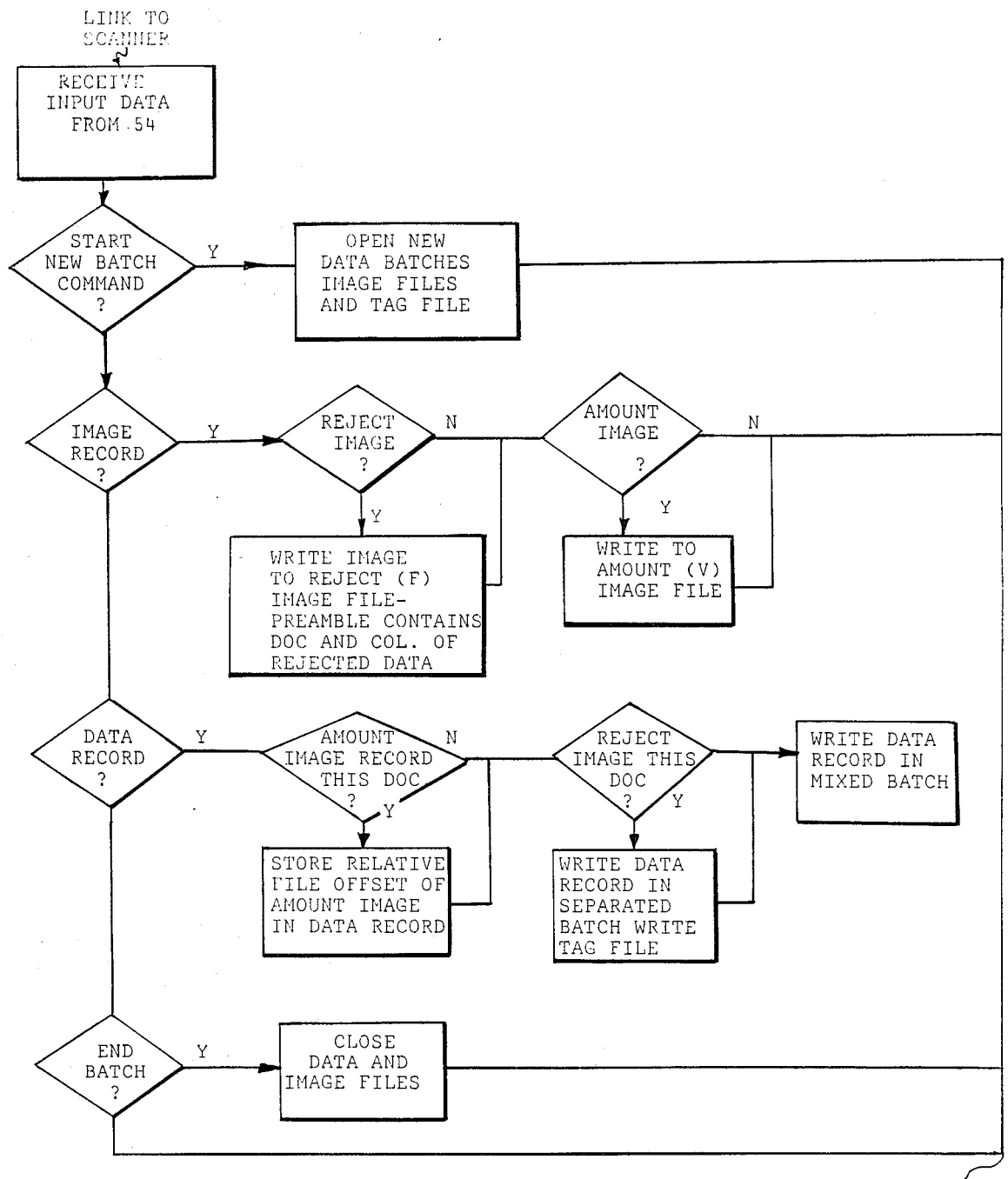
FIG. 8 a logic diagram depicting the preprocessing of document related information received from the scanner subsystem by the editing subsystem in accordance with the preferred embodiment of the invention.
Figure 9A:
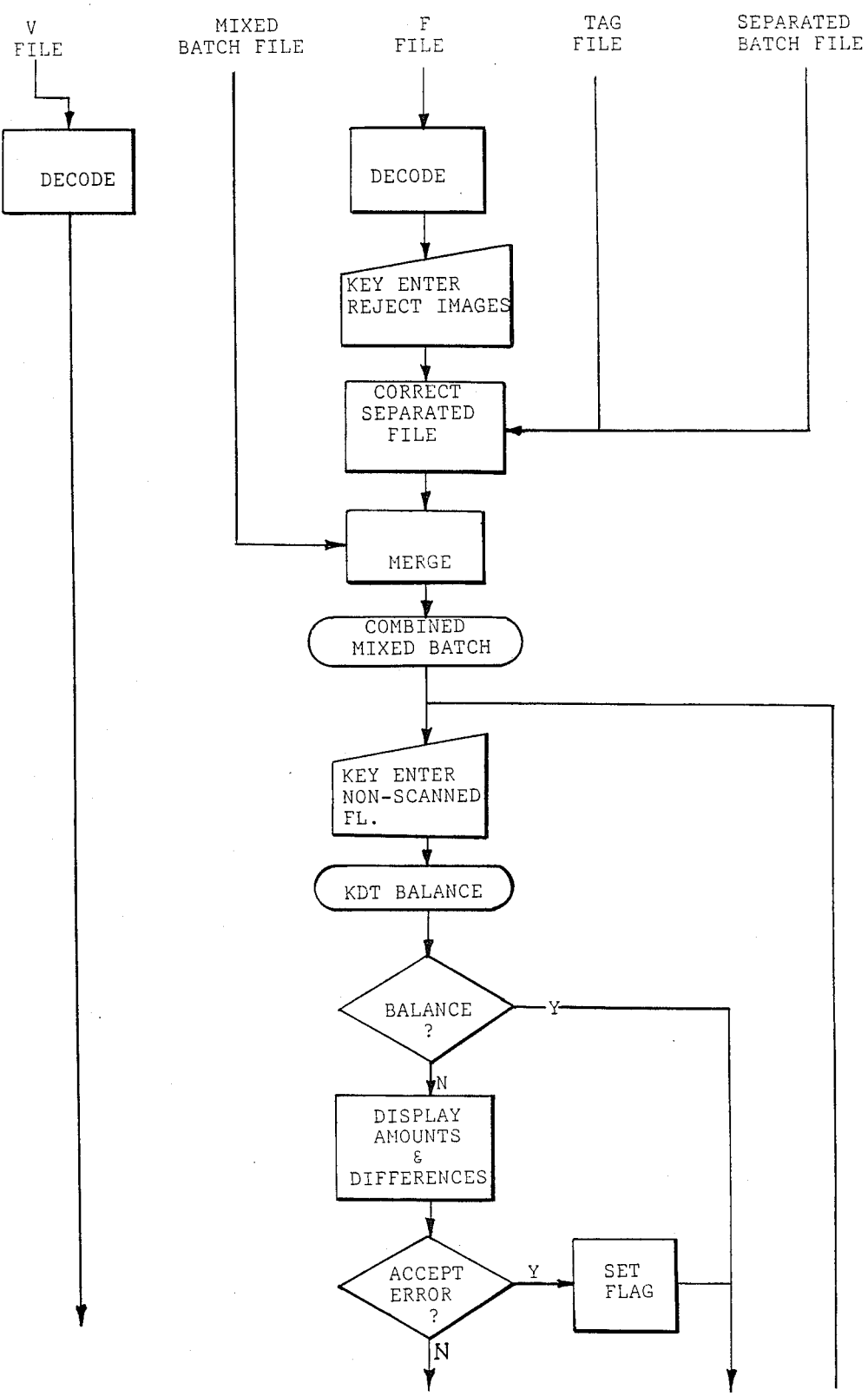
FIGS. 9A and 9B are a flow chart depicting the correction and manipulation of the preprocessed information by the editing subsystem.
Figure 9B:
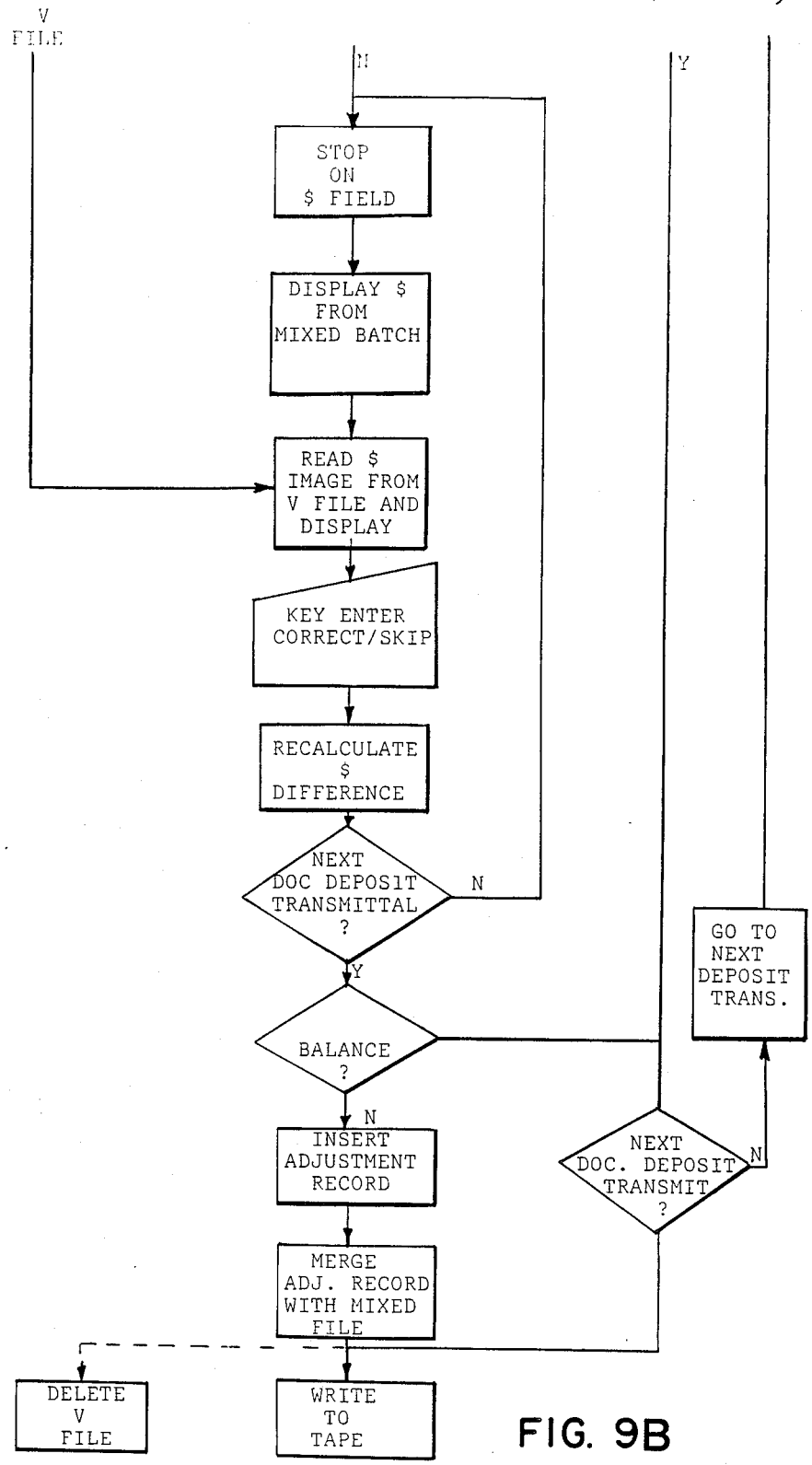

Document records generated by the scanner subsystem are transmitted to the editing subsystem where they are processed in the manner depicted in FIGS. 8 and 9 employing the hardware represented in FIG. 10. As will become obvious from the description below, the editing subsystem will generate various files for subsequent document processing and will route scanner data to the appropriate file. As may be observed from FIG. 1, five files are associated with a block of work.

The received information is tested to see if it comprises a "start new batch" command, i.e., if the data was derived from a block header. If this test is answered in the affirmative, the five files will be generated, i.e., new "mixed" and "separated" batch files, a new tag file and new "F", i.e., video (reject) and "V", i.e. balance image files will be opened and the batch previously being processed will be ended. Upon the opening of a new batch, an acknowledgement message will be sent back to the scanner subsystem and the transmission of the information commensurate with each document comprising the new batch will be initiated.

If the answer to the above-mentioned first test is answered in the negative, the data will again be tested to determine whether it comprises an image or data record. If an image record is being received, another test will be performed to determine whether the record preamble includes the "F" code. If the image is in fact a reject image, it will be written to the video (F) file. The F file is a sequential file, i.e., the stored data may be accessed only in sequential fashion.

Image data records will also be tested to determine if they are commensurate with an amount field, i.e., the image data records will, in addition to being tested for the presence of the "F" code, be tested for the presence of the "V" code. If the "V" code is present, the image will be written to the image balance ("V") file regardless of whether that image data record has been written to the video (F) file. The V file is a contiguous file, i.e. has an organization that permits direct access to each image.

If the received information is a data record, it will be tested to determine if an amount image has been received for the same document. The existence of an associated image record is indicated by the setting of an image "flag". If this test is answered in the affirmative, the relative file offset of the associated amount image will be determined and subsequently stored as part of the data record for use in the image balancing procedure.

The data record will also be tested to determine if a reject image is associated therewith as indicated by the presence of the F code in the image record preamble. If this test is answered in the affirmative, the data record will be written in the separated batch file and a "tag" file will be written. The separated batch file will be a subset of the mixed or main batch file to be described below.

Each non-control document data record is written to the "mixed" batch file. As noted above, the data record for a merchant transmittal (deposit) document is schematically depicted in FIG. 11 while the data record for a sales draft document is schematically depicted in FIG. 12. It is to be noted that these document data records are tagged, i.e. tied, to the amount field image files by the image flag portion thereof which carries the relative file offset of the image in the image file. It is also to be noted that portions of the data records, the image field and running total for example, are provided for internal use of the editing subsystem and will not be used by the main frame computer which processes the information outputted by the present invention.

If a start new batch command is received during the processing of a batch, as noted above, the last opened data and image files will be closed.

After preprocessing in the manner described above in the discussion of FIG. 8, the data transmitted from the scanner subsystem is ready for "image correction" and subsequent account reconciliation. This is accomplished in accordance with the technique represented in FIG. 9. The "reject" images comprising the F file are decoded and sequentially presented to the operator of a video display terminal. Each terminal will comprise a video display 70 and a keyboard 72, the keyboard and display being separately coupled to a multiplexer bus 74 via respective controllers 76 and 78 as shown in FIG. 10. The image display controller 78 includes an image decoder. The multiplexer bus, in turn, is connected to the input/output bus 80 of the editing subsystem computer 79 via a multiplexer 82. As each "reject" image is displayed, the operator will enter, via the keyboard, data commensurate with the characters which the recognition processor in the scanner subsystem could not identify. In the case of an account number or date, it may be necessary for the operator to make only one or two key strokes to "correct" the image. However, in the case of a reject amount image, the operator will enter all of the numerals.

The tag file associates the "reject" images of the F file with the incomplete data records comprising the separated batch file. Accordingly, the key entry of data at a time when a particular image is being displayed will result in "repair" of data outputted from the scanner subsystem, i.e., the key entered data will be inserted in the document data records comprising the separated batch file using the tag file as a map. When all reject image related data has been "repaired" by key entry, the separated and mixed batch files will be merged. The result of this merger will be a combined mixed batch which comprises a completed, but not necessarily correct, data record for each document comprising the batch being processed. The F, tag and separated files are, upon successful completion of the merger, all deleted. However, all of the captured images of amount fields will remain in the V-file.

The operator will next operate on the combined mixed batch to key enter any missing data which is derived from non-scannable fields on the documents and to balance the batch. The non-scannable fields may, for example, be those commensurate with missing account numbers. The missing data is brought to the operator's attention by a message prompt generated by the editing subsystem program. During an initial KDT balance procedure, each document sub-set within the batch will be checked, without reference to the images in the V file, for a balance condition. That is, the amount on each deposit transmittal document will be compared to the sum of the amounts on all of the sales drafts in the batch until the next transmittal document is encountered. During the KDT balance, which looks at the amounts of each data record of a batch sub-set, a running total will be added to each document data record. In the simplified example being described, wherein only a single sub-set within a document batch is being considered, the account balancing will determine if the amount the merchant has entered on a single deposit transmittal equals the net dollar amount of all of the sales draft documents which immediately follow the deposit transmittal in the batch.

If the sub-set is in balance, the system displays a message to the operator and processing continues with the next sub-set. If the sub-set is out of balance, the system stops the operator and the amount totals and the difference therebetween are displayed. At this point, the operator has the option of accepting the out-of-balance condition and continuing processing with the next sub-set. If the operator accepts the error, an error flag is automatically set and will be included in the report outputted by the editing subsystem. If the operator chooses not to accept the error, an "image balance" routine will be instituted. The image balance routine comprises the simultaneous display of each image in the V file and the amount attributed to that image as included in the data record for the same document. The operator may then key enter every amount as it is displayed or key enter only those image amounts which are visually observed to be different from the data record amounts. Each time the operator enters an amount, the system will recalculate the running total and compare the recalculated total with the previous running total. If a difference is detected, that difference will be calculated and compared to the previously displayed difference. If the difference has been eliminated, the operator will be prompted to discontinue the image balance routine.

Regardless of whether the image balance routine produces an account balanced condition, a test will be made to ensure that the processing of the sub-set has been completed, as indicated by the next document in the batch comprising a deposit transmittal form or a control document. If images of all of the documents comprising the sub-set have been displayed during the image balance routine, or if the previously displayed difference has been eliminated and the system stepped to the end of the sub-set, a test will be conducted to determine whether the sub-set is in balance. If the sub-set is not at this time in balance, the operator may select to insert an adjustment record in the report to be generated and, in this case, the operator will key enter the required information to complete the adjustment record. The adjustment record consists of an indication of the type of adjustment, a reason code and the amount of the adjustment. The adjustment record will be merged with the mixed batch data records.

When processing of all sub-sets comprising a batch is completed, and after an adjustment record has been generated in the simplified example being described, or the operator has determined to accept an error, or the account has been tested and found to be in balance, a record will be written to tape and the V file will thereafter be deleted. The record which is written to tape will, for the deposit transmittal and sales draft documents, be in the form indicated in FIGS. 11 and 12. The tape will then be delivered to a main frame computer which will process the accounts, including preparation of the cardholder account statements.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. In a method for the processing of documents relating to business transactions, the documents including summary documents and plural associated individual transaction documents, the documents each including an amount field in which characters representing a dollar amount are manually entered, the method including the delivery of the documents individually to optical character recognition apparatus wherein the amount field is scanned and an attempt is made to recognize the manually entered characters, the improvement comprising the steps of:

scanning the amount field of each document and capturing an image of the dollar amount entered in the scanned field;

digitizing the captured images;

generating a first code which indicates that a captured image is commensurate with a dollar amount;

generating a second code which indicates that not all of the characters comprising a dollar amount image have been recognized by the character recognition apparatus;

generating a preamble for each digitized image, the preambles including information which identifies the image;

incorporating the first code and any generated second code into the preamble of the associated digitized image;

generating a data record for each document, each data record including identification information for the digitized image for the associated document;

storing each digitized image which includes the first code in its preamble in a first file;

storing each digitized image which includes the second code in its preamble in a second file whereby digitized images of dollar amounts may be simultaneously stored in two separate files;

storing the data records having digitized images associated therewith;

sequentially creating a display of each captured image stored in the second file;

amending the data record associated with each displayed image by inserting therein the dollar amount visually perceived from the display;

calculating the total net dollar amount of all of the individual transaction documents associated with a summary document;

comparing the calculated total amount with the amount comprising the data record for the said summary document and providing an indication of whether the calculated amount equals the amount from the summary document;

displaying images stored in digitized form in the first file if the calculated amount does not equal the summary document amount;

comparing each of the displayed images from the first file with the corresponding data record amount;

correcting the data record amount in each case where the comparison indicates a difference; and recording for further processing all of the document data records subsequent to any amendment and correction.

2. The method of claim 1 further comprising the step of:

determining whether the total net dollar amount of the individual transaction documents equals the summary document amount after each correction.

3. The method of claim 1 wherein the step of generating data records includes:

incorporating a reject image flag in each data record having associated therewith an image with the second code in its preamble.

4. The method of claim 3 wherein the step of storing the data records includes:

storing all of the data records having a dollar amount image associated therewith in a third file; and storing all of the data records having a reject image flag in a fourth file.

5. The method of claim 4 wherein the step of amending the data records includes:

modifying the data records in the fourth file to obtain conformity with the displayed images; and merging the third and fourth files.

6. The method of claim 5 further comprising the step of:

determining whether the total net dollar amount of the individual transaction documents equals the summary document amount after each correction.

7. The method of claim 1 wherein the step of storing the data records includes:

adding to each data record information commensurate with the location in the first file where the associated amount image is stored.

8. The method of claim 6 further comprising the step of:

adding the location in the first file where the associated amount image is stored to the data records.

9. The method of claim 8 wherein the step of correcting comprises:

displaying the amount from the document data record;

employing the image location information from the data record to locate the corresponding image in the first file;

displaying the located image from the first file;

visually comparing the displayed image amount with the displayed amount from the document data record;

correcting the data record if the displayed amounts are unequal.

10. The method of claim 1 wherein the step of capturing an image comprises the step of:

truncating the image to that portion of the field which contains indicia which was detected to be present during scanning.

11. The method of claim 10 wherein the amount field is comprised of a predetermined maximum number of character spaces and wherein the step of truncating the image comprises:

scanning the amount field right to left and noting the presence of indicia in the character spaces;

testing for the logical end of the field as indicated by two blank character spaces after the second character space;

testing for the actual end of the field as indicated by the scanning of the maximum number of character spaces;

calculating the recognized field size as a function of the result of the testing, the recognized field size being the number of character spaces scanned to the logical field end less two character spaces or the maximum number of character spaces less any blank character spaces immediately before the actual field end; and capturing an image of the field as calculated.

12. The method of claim 11 wherein the step of storing the data records includes:

adding to each data record information commensurate with the location in the first file where the associated amount image is stored.

13. The method of claim 12 wherein the step of generating data records includes:

incorporating a reject image flag in each data record having associated therewith an image with the second code in its preamble.

14. The method of claim 13 wherein the step of storing the data records further includes:

storing all of the data records having a dollar amount image associated therewith in a third file; and storing all of the data records having a reject image flag in a fourth file.

15. The method of claim 14 wherein the step of amending the data records includes:

modifying the data records in the fourth file to obtain conformity with the displayed images; and merging the third and fourth files.

16. The method of claim 15 wherein the step of correcting comprises:

displaying the amount from the document data record;

employing the image location information from the data record to locate the corresponding image in the first file;

displaying the located image from the first file;

visually comparing the displayed image amount with the displayed amount from the document data record;

correcting the data record if the displayed amounts are unequal.

17. The method of claim 1 wherein the documents to be processed also include an account number field and wherein said method further comprises the steps of:

attempting to recognize the account number with the character recognition apparatus;

capturing an image of the account number field if more than two characters comprising the account number are not recognized;

capturing an image of each unrecognized character if no more than two characters comprising the account number field can not be recognized;

incorporating that portion of the account number which is recognized into the data record for the associated document;

digitizing each captured account number field image;

generating a preamble for each digitized account number field image;

including the second code in each digitized account number field image preamble;

storing the digitized account number field images in the second file;

creating a display of each account number field image stored in the second file; and amending the data record associated with each displayed account number field image by inserting therein the characters visually perceived from the display.

18. The method of claim 17 wherein the documents to be processed each further include indicia which identifies the document by type, the account number also indicating the document type, and wherein said method further comprises the steps of:

reading the document type indicia with the optical character recognition apparatus; and comparing the document type if determined from the account number with the type determined from the read type indicia.

19. The method of claim 18 wherein the type identification indicia also contains information which identifies the location of the fields on the document which are to be scanned.

20. The method of claim 16 wherein the documents to be processed also include an account number field and wherein said method further comprises the steps of:

attempting to recognize the account number with the character recognition apparatus;

capturing an image of the account number field if more than two characters comprising the account number are not recognized;

capturing an image of each unrecognized character if no more than two characters comprising the account number field can not be recognized;

incorporating that portion of the account number which is recognized into the data record for the associated document;

digitizing each captured account number field image;

generating a preamble for each digitized account number field image;

including the second code in each digitized account number field image preamble;

storing the digitized account number field images in the second file;

creating a display of each account number field image stored in the second file; and amending the data record associated with each displayed account number field image by inserting therein the characters visually perceived from the display.

21. The method of claim 20 wherein the documents to be processed each further include indicia which identifies the document by type, the account number also indicating the document type, and wherein said method further comprises the steps of:

reading the document type indicia with the optical character recognition apparatus; and comparing the document type if determined from the account number with the type determined from the read type indicia.

22. A method for the recordation of information commensurate with a multi-character message entered in a field on a document, the message having a predetermined maximum number of characters, a character space being allocated to each possible character, the method comprising the steps of:

scanning the field in a first direction;

noting the presence of indicia in the character spaces comprising the field;

terminating scanning when a specified number of adjacent character spaces beginning at a predetermined location in the field are devoid of indicia;

terminating scanning when the maximum number of character spaces have been scanned;

calculating a recognized field size as a function of when scanning was terminated, the recognized field size being the greater of the number of character spaces scanned less the specified number of spaces or the maximum number of spaces less the number of spaces at the end of the field in the direction of scanning which are devoid of indicia;

capturing an image of the calculated field; and digitizing and recording the captured image.

23. The method of claim 22 wherein the message is a dollar amount, the direction of scanning is right to left and the predetermined location is the least significant digit in the dollar portion of the field.

24. The method of claim 23 wherein the specified number is two.

25. The method of claim 22 further comprising the steps of:

delivering the document to an optical character recognition apparatus for scanning, the apparatus providing a signal commensurate with characteristics of the scanned indicia;

comparing the signal commensurate with the scanned indicia with signals commensurate with the same characteristics of a plurality of numerals to thereby identify the scanned indicia as a numeral; and recording the identified numerals in digital form whereby both the image and recognized identity of the message will be stored.

26. In a method for the processing of documents relating to business transactions, the documents including summary documents and plural associated individual transaction documents, the documents each including an amount field comprised of a predetermined maximum number of character spaces in which characters representing a dollar amount may be entered, the method including the delivery of the documents individually to optical character recognition apparatus wherein the amount fields are scanned and an attempt is made to recognize as a numeral indicia present in each of the character spaces, the improvement comprising the steps of:

scanning the amount field in a right-to-left direction and noting the presence of indicia in the character spaces;

testing for the logical end of the amount field as indicated by the presence of two blank adjacent character spaces after the second scanned character space;

testing for the actual end of the amount field as indicated by the scanning of the maximum number of character spaces;

calculating the recognized field size as a function of the result of the testing, a recognized field size being the smaller of the number of character spaces scanned to the logical field end less two character spaces or the maximum number of character spaces less any blank character spaces immediately before the actual field end;

capturing an image comprising the number of characters in spaces comprising the recognized field size;

digitizing the capture ed images;

generating a first code which indicates that a captured image is commensurate with a dollar amount;

generating a second code which indicates that not all of the characters comprising a dollar amount image have been recognized by the character recognition apparatus;

generating a preamble for each digitized image, the preambles including information which identifies the image;

incorporating the first code and any generated second code into the preamble of the associated digitized image;

generating a data record for each document, each data record including identification information for the digitized image for the associated document;

storing each digitized image which includes the first code in its preamble in a first file;

storing each digitized image which includes the second code in its preamble in a second file whereby digitized images of dollar amounts may be simultaneously stored in two separate files;

storing the data records having digitized images associated therewith;

sequentially creating a display of each captured image stored in the second file; and amending the data record associated with each displayed image by inserting therein the dollar amount visually perceived from the display.

27. The method of claim 26 wherein the step of storing the data records includes:

adding to each data record information commensurate with the location in the first file where the associated amount image is stored.

28. The method of claim 27 wherein the step of generating data records includes:

incorporating a reject image flag in each data record having associated therewith an image with the second code in its preamble.

29. The method of claim 28 wherein the step of storing the data records further includes:

storing all of the data records having a dollar amount image associated therewith in a third file; and storing all of the data records having a reject image flag in a fourth file.

30. The method of claim 29 wherein the step of amending the data records includes:

modifying the data records in the fourth file to obtain conformity with the displayed images; and merging the third and fourth files.

31. The method of claim 30 further comprising:

calculating the total net dollar amount of all of the individual transaction documents associated with a summary document and providing an indication of whether the calculated amount equals the amount from the summary document;

displaying images stored in digitized form in the first file if the calculated amount does not equal the summary document amount;

comparing each of the displayed images from the first with the corresponding data record amount;

correcting the data record amount in each case where the comparison indicates a difference; and recording for further processing all of the document data records subsequent to amendment.

32. The method of claim 31 wherein the step of correcting the data record amount comprises:

displaying the amount from the document data record;

employing the image location information from the data record to locate the corresponding image in the first file;

displaying the located image from the first file;

visually comparing the displayed image amount with the displayed amount from the document data record; and correcting the data record if the displayed amounts are unequal.

* * * * *